(12) United States Patent
Johnston et al.

(10) Patent No.: US 9,199,849 B2
(45) Date of Patent: Dec. 1, 2015

(54) PROCESS FOR PRODUCING NITRIC ACID

(75) Inventors: Anthony Matthew Johnston, Double Bay (AU); Brian Scott Haynes, Frenchs Forest (AU)

(73) Assignees: ORICA INTERNATIONAL PTE LTD, Singapore (SG); THE UNIVERSITY OF SYDNEY, Sydney, New South Wales (AU)

( * ) Notice: Subject to any disclaimer, the term of this patent is extended or adjusted under 35 U.S.C. 154(b) by 0 days.

(21) Appl. No.: 13/878,747

(22) PCT Filed: Dec. 1, 2011

(86) PCT No.: PCT/AU2011/001555
§ 371 (c)(1),
(2), (4) Date: Jul. 12, 2013

(87) PCT Pub. No.: WO2012/071615
PCT Pub. Date: Jun. 7, 2012

(65) Prior Publication Data
US 2013/0294998 A1 Nov. 7, 2013

(30) Foreign Application Priority Data

Dec. 1, 2010 (AU) ................................ 2010905285

(51) Int. Cl.
*C01B 21/26* (2006.01)
*C01B 21/38* (2006.01)
*C01B 21/40* (2006.01)

(52) U.S. Cl.
CPC ................. *C01B 21/38* (2013.01); *C01B 21/26* (2013.01); *C01B 21/40* (2013.01)

(58) Field of Classification Search
CPC ...... C01B 21/20; C01B 21/26; C01B 21/262; C01B 21/48; C01B 21/38–21/46; C01C 1/18; C01C 1/185

USPC .......... 423/390.1–394.2, 396, 405, 392, 395, 423/403; 71/39, 50; 422/615, 621
See application file for complete search history.

(56) References Cited

U.S. PATENT DOCUMENTS 1,378,271 A * 5/1921 Partington ..................... 423/403
1,744,652 A * 1/1930 Georg ........................... 423/392
(Continued)

FOREIGN PATENT DOCUMENTS

| CN | 102001635 A | 4/2011 |
|---|---|---|
| DE | 1900861 A1 | 9/1970 |

(Continued)

OTHER PUBLICATIONS

Perry's Chemcial Engineers' Handbook, "Heat Transfer Equipment," 2008, McGraw-Hill, 8th Edition, pp. 11-85 to 11-87.*

(Continued)

*Primary Examiner* — Anthony J Zimmer
*Assistant Examiner* — Justin Bova
(74) *Attorney, Agent, or Firm* — Wilson Sonsini Goodrich & Rosati

(57) ABSTRACT

A process for producing nitric acid is disclosed in which a gaseous oxidizer feed composed at least substantially of ammonia, steam and an oxidizing gas is exposed to conditions whereby the ammonia is oxidized to produce a reaction mixture including nitrogen monoxide and water vapor. The reaction mixture is then cooled in a heat exchanger whereby: a) the nitrogen monoxide is oxidized and the water vapor is caused to condense, b) the products of the nitrogen monoxide oxidation react with and are absorbed by the condensed water, and c) substantially all of the nitrogen monoxide in the reaction mixture is converted to nitric acid. Also disclosed is a nitric acid solution when produced by the disclosed process.

24 Claims, 4 Drawing Sheets

(56) References Cited

U.S. PATENT DOCUMENTS

| | | | |
|---|---|---|---|
| 1,949,462 A | 3/1934 | Fogler | |
| 2,132,663 A | 10/1938 | Voogd | |
| 2,578,674 A | 12/1951 | Daniels et al. | |
| 3,102,788 A | 9/1963 | Newman | |
| 3,110,563 A | 11/1963 | Krauss et al. | |
| 3,489,515 A * | 1/1970 | Krauss et al. | 95/187 |
| 3,560,147 A * | 2/1971 | Janiczek et al. | 423/403 |
| 3,584,998 A * | 6/1971 | Green | 423/352 |
| 3,620,282 A | 11/1971 | Newton | |
| 3,634,031 A | 1/1972 | Hellmer | |
| 3,915,675 A | 10/1975 | Scheibler et al. | |
| 3,927,182 A | 12/1975 | Powell | |
| 4,081,518 A | 3/1978 | Selin et al. | |
| 4,309,396 A * | 1/1982 | Herbrechtsmeier et al. | 423/393 |
| 5,266,291 A | 11/1993 | Drnevich et al. | |
| 5,985,230 A | 11/1999 | Vlaming | |
| 6,117,406 A | 9/2000 | Vogel et al. | |
| 7,364,711 B2 * | 4/2008 | Wessel et al. | 423/239.1 |
| 2002/0127932 A1 * | 9/2002 | Neumann et al. | 442/6 |
| 2003/0143148 A1 * | 7/2003 | Maurer | 423/392 |
| 2005/0106092 A1 * | 5/2005 | Dziobek et al. | 423/392 |
| 2009/0020263 A1 * | 1/2009 | Ohsawa et al. | 165/104.11 |
| 2011/0002836 A1 * | 1/2011 | Dubois et al. | 423/392 |
| 2013/0287670 A1 | 10/2013 | Johnston et al. | |

FOREIGN PATENT DOCUMENTS

| | | |
|---|---|---|
| DE | 10302955 A1 | 8/2004 |
| DE | 102005006027 A1 | 8/2006 |
| GB | 869062 A | 5/1961 |
| GB | 1028202 A | 5/1966 |

OTHER PUBLICATIONS

International search report dated Feb. 15, 2012 for PCT/AU2011/001555.

International search report dated Feb. 15, 2012 for PCT/AU2011/001556.

Office action dated Sep. 9, 2013 for U.S. Appl. No. 13/878,743.

Office action dated Jan. 31, 2014 for U.S. Appl. No. 13/878,743.

U.S. Appl. No. 14/577,551, filed Dec. 19, 2014, Johnston et al.

ERTL; et al., "Handbook of Heterogeneous Catalysis", Wiley, Feb. 2008, 8 (2), 2575-92.

Satterfield., "Heterogeneous Catalysis in Industrial Practice", Krieger Pub., 1996, Second edition, 314.

Sorrell., "Organic Chemistry. Chapter 5 Chemical reactions and mechanisms.", University Science Books, 2006, Second Edition.

Notice of allowance dated Sep. 24, 2014 for U.S. Appl. No. 13/878,743.

* cited by examiner

PROCESS FOR PRODUCING NITRIC ACID

CROSS-REFERENCE

This application is a national phase application of PCT Application No. PCT/AU2011/001555, which was filed on Dec. 1, 2011, which claims priority to Australian Patent Application No. 2010905285 filed on Dec. 1, 2010, both of which are incorporated herein by reference in their entirety.

TECHNICAL FIELD OF THE INVENTION

This invention relates to a process for producing nitric acid.

BACKGROUND OF THE INVENTION

Nitric acid conventionally is produced by use of the Ostwald process, in which ammonia is entrained with air and oxidised to form nitrogen monoxide (NO). The nitrogen monoxide is then further oxidised to form nitrogen dioxide ($NO_2$) and its dimer dinitrogen tetroxide ($N_2O_4$), which are reacted with and are absorbed by water to produce a solution of nitric acid ($HNO_3$). These reactions can be represented by the following (simplified) chemical equations:

$$4NH_3 + 5O_2 \rightarrow 4NO + 6H_2O \quad (1)$$

$$2NO + O_2 \rightarrow 2NO_2 \leftrightarrow N_2O_4 \quad (2)$$

$$3NO_2 + H_2O \rightarrow 2HNO_3 + NO \quad (3)$$

Reaction (2) is the rate limiting reaction in the Ostwald process and this is accommodated by allowing the nitrous gases (i.e., those involved in reactions (2) and (3)) to react for a substantial period of time within an absorption tower whilst adding water to ensure that substantially all of the nitrogen monoxide produced in reaction (1) reacts to produce the nitric acid. The product acid concentration is typically between 50% and 68% $HNO_3$ (w/w), depending upon the operating pressure of, the number of absorption stages in, and the concentration of nitrous gases entering, the absorption tower. However, the nitrous gases typically are relatively dilute, because of the presence of nitrogen introduced with the air, and, hence, a large tower typically is required to facilitate reaction and absorption. Additionally, reaction (2) proceeds more quickly at lower temperatures and this is facilitated by providing refrigerated cooling within the absorption tower, adjacent its exit, in order to prevent or minimise the escape to the atmosphere of nitrogen oxides.

It has now been recognised by the Inventors that, with substantial modification to the manufacturing process, including providing the oxidant for the oxidation of the ammonia in the form (at least substantially) of oxygen, admission of water ballast prior to the ammonia oxidation stage, and retention of the water ballast throughout the process, an absorption stage may be adopted that utilises heat exchange technology and which obviates the requirement for an absorption tower and its attendant disadvantages.

SUMMARY OF THE INVENTION

Broadly defined, the present invention provides a process for producing nitric acid and in which a gaseous oxidiser feed composed at least substantially of ammonia, steam and an oxidising gas is exposed to conditions whereby the ammonia is oxidised to produce a reaction mixture including nitrogen monoxide and water vapour. The reaction mixture is then cooled in a heat exchanger whereby:

a) the nitrogen monoxide is oxidised and the water vapour is caused to condense,
b) the products of the nitrogen monoxide oxidation react with and are absorbed by the condensed water, and
c) substantially all of the nitrogen monoxide in the reaction mixture is converted to nitric acid.

The term "oxidising gas" as used in the above and following definitions of the invention is to be understood as meaning a gas containing more than about 80% (v/v) oxygen. The oxidising gas desirably contains at least 90% (v/v) and, depending upon plant size, most desirably at least 95% (v/v) oxygen.

Also, by "substantially all of the nitrogen monoxide" in the above and following definitions of the invention is meant an amount of nitrogen monoxide greater than 90%, desirably greater than 95% and, most desirably, up to a level approaching as near as possible 100% of that present in the reaction mixture. When conversion within the heat exchanger occurs at a level lower than that which is most desired, the reaction-absorption process may be continued in a subsequent reactor-absorber vessel or pipe, with or without heat exchange. Thus, conversion approaching 100% in the heat exchanger is not essential because the reaction-absorption process may be continued, beyond that which occurs in the heat exchanger, in a subsequent adiabatic reactor-absorber, albeit to a limited extent. That is, it is known that higher temperatures are deleterious to nitrogen monoxide conversion and absorption and, to the extent that subsequent reaction-absorption is undertaken adiabatically, substantial temperature rises can occur in the reacting stream. For example, progressing from 99% to 100% nitrogen monoxide conversion adiabatically would entail a temperature rise of the order of 2.5° C., whereas progressing from 90% to 100% conversion would entail a temperature rise of 24° C.

The present invention also provides a solution of nitric acid when produced by the above defined process.

The nitric acid produced by the above defined process will inherently be dilute, having for example a concentration of the order of 20% to 40% $HNO_3$ (w/w), depending upon the amount of water that is contained in the reaction mixture. The level of concentration may be increased by downstream processes that are known in the art, although the nitric acid in its dilute form may be employed for downstream production of further products such as ammonium nitrate.

An incidental advantage of producing dilute nitric acid is that the prior art need to decolourise (or bleach) the nitric acid may be avoided. Nitric acid produced by the prior art process and having a concentration greater than about 55% $HNO_3$ (w/w) contains dissolved nitrogen dioxide in amounts sufficient to impart a brown colour to the acid. Such high concentrations of dissolved nitrogen dioxide must substantially be removed prior to storage or transport of the acid, the removal being accomplished in an operation known in the art as bleaching or decolourising. The equilibrium of reaction (3) (above) lies much further to the right with dilute nitric acid, thus resulting in reduction of the amount of nitrogen dioxide that exists in the dilute nitric acid and obviating the need for bleaching.

The heat exchanger that is employed in the above defined process may comprise any type of heat exchanger that provides for heat transfer from a process fluid (in the present invention the reaction mixture) to a coolant fluid, for example a shell-and-tube type heat exchanger, a printed-circuit type heat exchanger, a plate type heat exchanger or a fin-fan type heat exchanger. Fluid flow passages within the heat exchanger desirably have a small cross-sectional dimension (e.g., less than about 3 mm and desirably less than 2 mm equivalent diameter) in order to assist heat and mass transfer and to facilitate heat exchanger compactness. Also, depending upon processing demands, a single heat exchanger may be employed or two or more heat exchangers may be connected in parallel or in series, and the expressions "a heat exchanger" and "the heat exchanger" as employed in this specification are to be understood in this context. The coolant fluid may comprise a gas, for example fan forced air, or a liquid such as water.

The novel employment of the heat exchanger to complete the absorption in the absorption stage (as distinct from the employment in the prior art processes of a counter-current absorption tower) results in the production of relatively dilute nitric acid. Such acid has low equilibrium vapour pressures of nitric acid and nitrous gases, this obviating the need for counter-current contacting to achieve complete absorption of these components. Nevertheless, the rate at which the conversion of nitrogen monoxide to acid occurs, as the process nears completion, is determined principally by the chemical rate of oxidation of nitrogen monoxide, which is strongly promoted by higher concentrations of nitrogen monoxide and oxygen. In the process of the present invention the steam that is employed to ballast the oxidation process substantially condenses during the course of the absorption process to form a part of the dilute nitric acid product, thereby increasing the concentration of the residual gaseous reactants and facilitating their relatively rapid reaction and absorption. The effect is to intensify the reaction/absorption process, which effect is greatest when, as in accordance with one embodiment of the invention, the oxidising gas composition is close to 100% oxygen.

Steam in the oxidiser feed serves to maintain the oxidiser feed below the explosive limit for ammonia-oxygen mixtures and to moderate the temperature rise during ammonia oxidation, as well as to function, when condensed, to absorb the products of the nitrogen monoxide oxidation.

The oxidising gas (hereinafter referred to as "oxygen") in the oxidiser feed (or a starting feed from which the oxidiser feed is derived) may be provided in an amount sufficient to oxidise substantially all of the ammonia and substantially all of the nitrogen monoxide. Alternatively, the oxygen in the feed may be provided in an amount sufficient to oxidise substantially all of the ammonia and additional oxygen be added to the reaction mixture before the water vapour condenses in order to oxidise substantially all of the nitrogen monoxide.

The starting feed may be provided with all of the ammonia, oxygen and water in gaseous states. Also, the starting feed may be provided by mixing oxygen into ammonia/steam, by mixing ammonia into oxygen/steam, or by mixing the separate constituents oxygen, ammonia and steam, but the risk of forming an explosive mixture desirably is avoided by not mixing steam into ammonia/oxygen.

In an alternative embodiment, when the starting feed is provided with water in a liquid state it may be vaporised either prior to or following mixing with the other components of the starting feed.

In a further embodiment, the ammonia may be dissolved in the water to form aqueous ammonia and, in the event that excess recycled aqueous ammonia is injected back into the starting feed (as will be hereinafter described), the ammonia may be dissolved in the water/recycled aqueous ammonia feed. The resultant feed may then be heated to vaporise the aqueous ammonia.

In the ammonia oxidation stage (where the steam-ballasted ammonia-oxygen feed is oxidised to form, predominantly, nitrogen monoxide within nitrous gas), the oxidiser feed may be heated to a temperature falling within the range 700° C. to 1000° C. (typically about 800° C.), at a pressure falling within the range 1 bar (abs.) to 15 bar (abs.) (typically about 2 bar (abs.)) in the presence of a catalyst. The catalyst may be embodied in any known type of catalytic system, including a cobalt oxide bed or a platinum-rhodium catalyst in the form of woven or knitted gauze layers. The heating of the oxidiser feed in the oxidiser may be brought about by the adiabatic heat release of the reaction, or by heat exchange with an external fluid, or by a combination of both. When heat exchange is employed for heating or cooling, the oxidiser may comprise a heat-exchanger reactor.

The reaction mixture from the ammonia oxidation stage may be cooled to a first temperature above the dew point of the reaction mixture (e.g., to a temperature of about 140° C.) by heat exchange with a heat transfer fluid, and the reaction mixture may be further cooled to a second temperature by heat exchange with a heat transfer fluid or other process fluid. The latter heat exchange may be effected between the reaction mixture and the starting feed (or components of the starting feed) which in such case becomes the heat transfer fluid, by what is referred to herein as feed-effluent heat exchange, utilising a feed-effluent heat exchanger. Such feed-effluent heat exchanger may be separate from or be integrated with the previously mentioned heat exchanger in which the products of the nitrogen monoxide oxidation react with and are absorbed by condensed water.

In some embodiments in which feed-effluent heat exchange is effected, any liquid component in the starting feed may be vaporised (at least partially) and any liquid component remaining in the starting feed following the feed-effluent heat exchange may be recirculated or, using previous terminology, recycled. By this process most of any liquid in the starting feed may be evaporated to the gaseous phase using what might be regarded as "low grade" heat, leaving "higher grade" heat that is generated within the process for such ancillary purposes as steam-raising for power generation. Accumulation of dissolved solids in the recirculating liquid may be prevented by provision of a blow-down stream.

The oxidation of the nitrogen monoxide and concurrent reactions leading to the formation of the nitric acid are governed by the operating pressures and temperatures appropriate to system design and, at least in the final absorption phase, by the temperature of available heat exchange coolant. Oxidation occurs only to a limited extent until post-oxidation cooling is initiated, that is (from the previously exemplified figures) at temperatures as high as 800° C. When the reaction mixture is cooled, the first liquid will form at the dew point at the operating pressure and the formation of acid will continue as the mixture is further cooled. At an operating pressure of about 15 bar (abs.) condensate will form and, thus, formation of nitric acid will commence, at the corresponding saturation temperature of about 200° C., and the acid formation will continue down to a temperature of about 50° C., assuming the latter temperature to be limited by the available coolant fluid temperature. For operation at 2 bar (abs.), the formation of acid will commence at about 110° C.

The invention will be more fully understood from the following description of three illustrative embodiments of processes for producing nitric acid. The description is provided by way of example with reference to schematic circuit (flow) diagrams as shown in the accompanying drawings.

DETAILED DESCRIPTION OF THE ILLUSTRATED EMBODIMENTS

Figure 1:
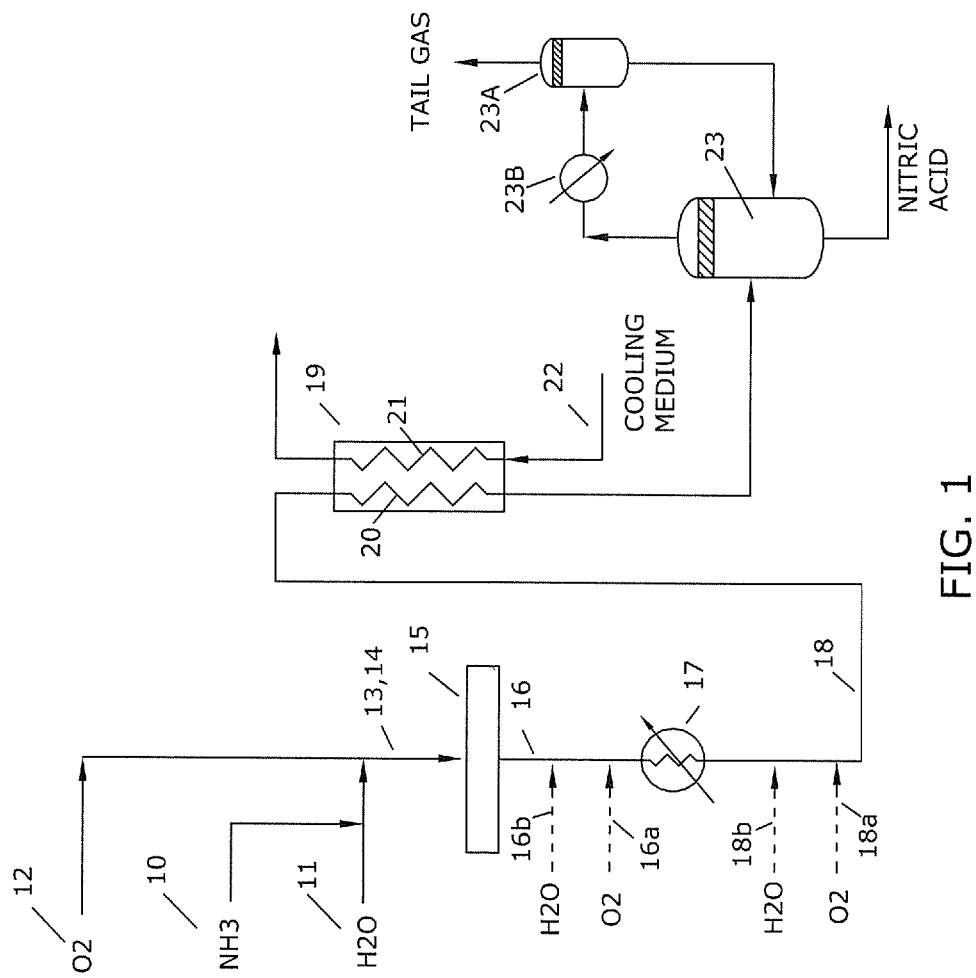
FIG. 1 shows a flow diagram applicable to a first embodiment of the invention, one in which water, ammonia and oxygen in gaseous form are combined to form a starting feed for the production of nitric acid.
Figure 2:
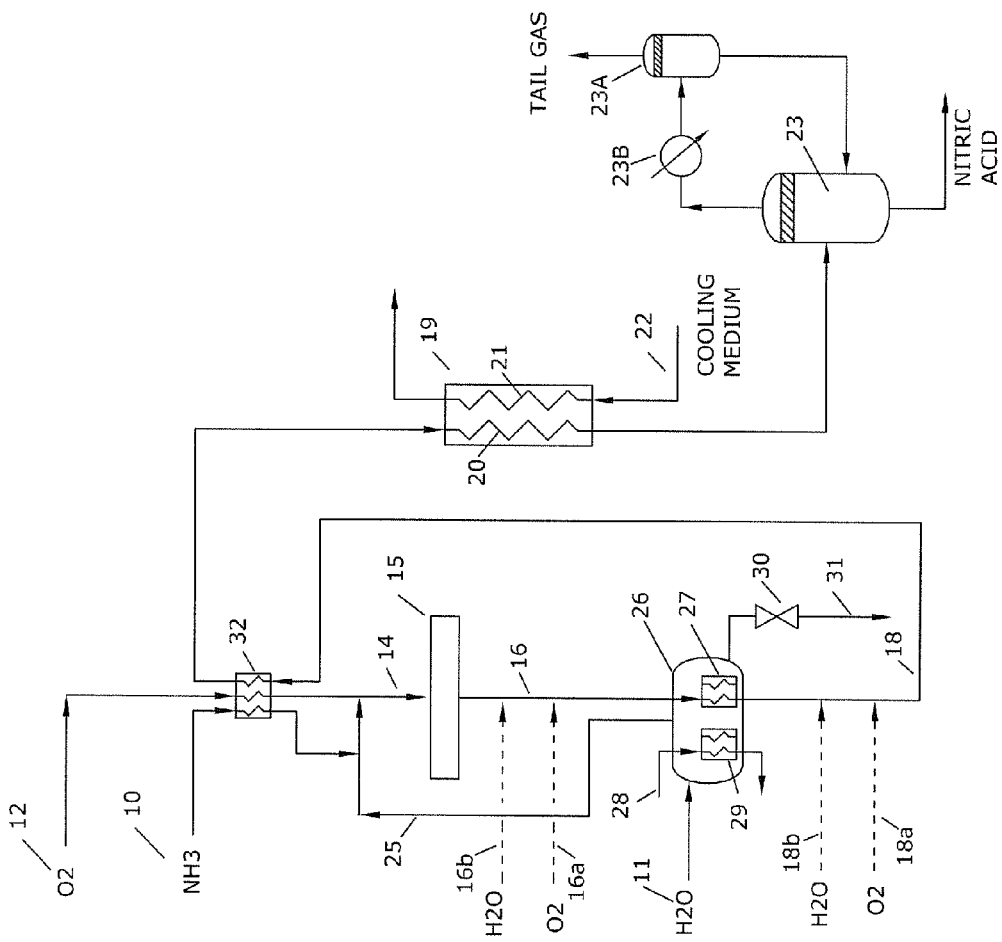
FIG. 2 shows a flow diagram applicable to a second embodiment of the invention, one in which liquid water is provided as a component of the starting feed and is vaporised to combine with ammonia and oxygen starting feed components.
Figure 3:
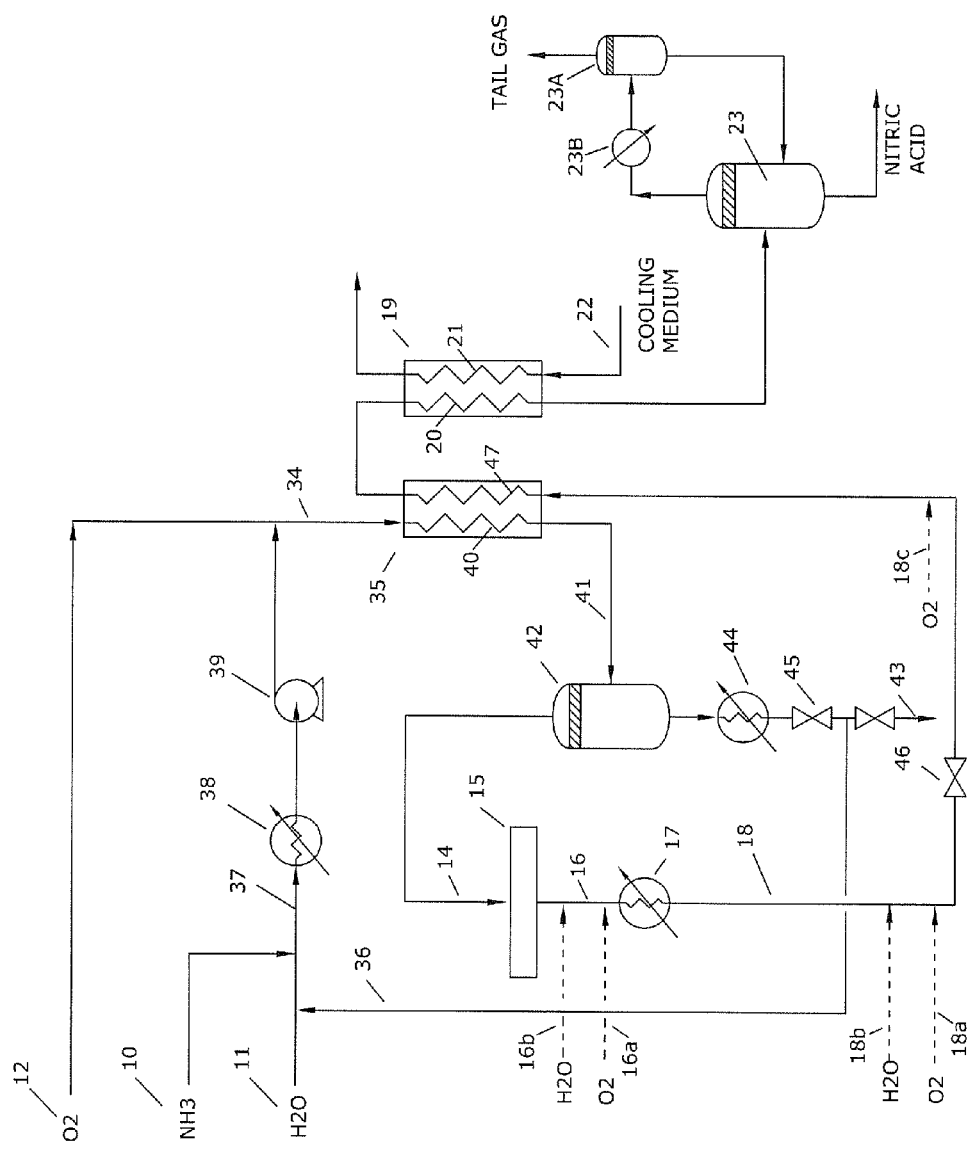
FIG. 3 shows a flow diagram applicable to a third embodiment of the invention, one in which aqueous ammonia and oxygen components are combined to form a feed which is streamed through a feed-effluent heat exchanger.

As a preliminary observation, all three embodiments (as shown in FIGS. 1 to 3) relate to the same invention (as above defined); namely one in which:
a gaseous oxidiser feed composed at least substantially of ammonia, steam and an oxidising gas is exposed to conditions whereby the ammonia is oxidised (in what previously has been termed an oxidiser but what is hereinafter referred to as a combustor) to produce a reaction mixture including nitrogen monoxide and water vapour, and the reaction mixture is cooled in a heat exchanger whereby the nitrogen monoxide is oxidised and the water vapour is caused to condense, and the products of the nitrogen monoxide oxidation react with and are absorbed by the condensed water,
with the result being that substantially all of the nitrogen monoxide in the reaction mixture is converted to nitric acid.

Reference is now made to the first example embodiment of the invention; that is to the process illustrated by the flow diagram of FIG. 1. In the process as illustrated in FIG. 1 a gaseous ammonia feed stream 10, a steam feed stream 11 and an oxygen feed stream 12 are combined to form a starting feed 13, with the ammonia and steam preferably being mixed ahead of their admission to the oxygen stream to avoid the potential for an explosive mixture. The respective feed streams are delivered at a sufficiently high temperature as to preclude the formation of condensate when a combustor feed 14 (corresponding in the case of the FIG. 1 embodiment to the starting feed 13) is fed to a combustor 15. All feed streams are delivered under a pressure slightly greater than a combustion pressure of about 2 bar (abs.)

The combustor 15 may comprise any type of ammonia oxidiser known in the art for use in high temperature catalytic conversion of an ammonia-oxygen mixture and may employ any known type of catalytic system, including a cobalt oxide bed. In one suitable form it may incorporate a platinum-rhodium catalyst in the form of woven or knitted gauze layers. In another form the combustor may be configured as a heat exchanger-reactor in which heat released during the reaction is transferred simultaneously to a coolant. The steam-ballasted ammonia-oxygen (combustor) feed 14 to the combustor 15 is heated by a combination of conduction, convection and radiation to the reaction temperature by the catalyst layers and reacts on the catalyst layers to form a nitrous gas stream. Except when oxidation is effected in a heat exchanger-reactor, the overall process is essentially (i.e., nearly) adiabatic and the temperature reached, assuming complete, highly-selective conversion of ammonia to nitrogen monoxide, is primarily a function of the quantity of steam ballast present. The temperature will typically be about 800° C. when the molar ratio of water to ammonia in the starting feed is about 5.6 and the concentration of ammonia in the combustor feed is about 11.4% (v/v). Such a combustor feed composition lies outside the expected ammonia explosion limits and gives rise to nitric acid product concentration of about 33.5% $HNO_3$ (w/w).

The resultant reaction mixture, including nitrogen monoxide and water vapour, indicated as stream 16, is fed to a following heat exchanger 17 where the reaction mixture is cooled by heat exchange with a heat transfer fluid such as pressurised (liquid) water, boiling water or oil. The heat exchanger 17 as illustrated comprises a quench boiler of a conventional type known in the art and in which the gas feed 16 is cooled to a temperature (of the order of 140° C.) above the level of dew point of the reaction mixture. Steam may be raised in the quench boiler for delivery to a steam turbine (not shown) or for process heating that is independent of the process of the present invention.

On exiting from the heat exchanger 17 the cooled reaction mixture 18, in which nitrogen monoxide will (as above mentioned) have started to oxidise, is fed to an absorber in the form of a heat exchanger 19. Water vapour condensation and continuing oxidation of the nitrogen monoxide and concurrent reactions leading to the formation of nitric acid, in the heat exchanger 19, are (as also mentioned above) governed by the operating pressures and temperatures employed in the system. Heat is exchanged between the cooled reaction mixture (as it proceeds through channels 20 of the heat exchanger 19) and heat exchange fluid 22, typically water, that is directed counter-current though channels 21 of the heat exchanger 19. The heat exchanger 19 may comprise any type of heat exchanger that is known in the art to be suitable for use in condensing/oxidising the reaction mixture feed down to dilute nitric acid, including a shell-and-tube type heat exchanger, a fin-fan type heat exchanger, a plate-type heat exchanger or a printed circuit type heat exchanger, and the heat exchange fluid 22 may comprise any fluid (i.e., liquid or gas) appropriate to the type of heat exchanger that is employed. Fluid flow passages within the heat exchanger desirably have a small cross-sectional dimension (typically less than about 3 mm and, desirably, less than 2 mm equivalent diameter) in order, as previously stated, to assist heat and mass transfer and in order to facilitate heat exchanger and, thus, plant compactness.

Gases not condensed or absorbed in the heat exchanger are separated from the nitric acid, to form a tail gas, by a separator 23. The principal components of the tail gas will be excess unreacted oxygen, argon and other impurities introduced with the oxygen feed to the process, nitrogen and nitrous oxide formed as by-products in the combustor, and water vapour. The tail gas exiting the separator 23 will also contain very low concentrations of nitrous gases. However, as illustrated, the tail gas may be fed from the separator 23 to a further separator 23A by way of a chiller-condenser 23B, these vessels acting effectively to provide reaction-absorption subsequent to that provided in the heat exchanger 19. Nitrous gases and nitric acid vapour absorbed in the chiller-condenser create a very weak acid stream (typically <2% (w/w)) that is fed back into the separator 23, thereby effectively eliminating the emission of nitric acid vapour and substantially reducing the nitrous oxide emissions from the process whilst also slightly enhancing product yield.

Supplementary oxygen, if required, is injected into the reaction mixture 16 and/or the cooled reaction mixture 18 stream(s), as indicated by dashed feed lines 16a and 18a, in order to provide for a small excess supply of oxygen to facilitate complete oxidation of nitrogen monoxide in the reaction mixture.

Similarly, if required, supplementary steam or water may be injected into the reaction mixture 16 and/or the cooled reaction mixture 18 stream(s), as indicated by dashed feed lines 16b and 18b, in order to provide for sufficient condensate to facilitate complete oxidation and absorption of nitrogen dioxide.

Reference is now made to the second example embodiment of the invention; that is to the process to which the flow diagram of FIG. 2 applies, in which water 11 is provided as a component of the starting feed and is vaporised before being combined with ammonia and oxygen starting feed components to form the combustor feed 14. Some of the process stages of, and, hence, processing equipment shown in, the flow diagram of FIG. 2 are the same as those of FIG. 1 and are not re-described, and like numerals are used to identify like equipment in the respective figures.

In the process illustrated by FIG. 2 ammonia and oxygen components 10 and 12 of the starting feed are supplied in gaseous form at a pressure slightly greater than the combustor pressure and at near ambient temperature. The water component 11 of the starting feed is supplied in liquid form, again at a pressure slightly greater than the combustor pressure, and the water is vaporised (to form a gaseous stream 25) before mixing firstly with the ammonia starting feed component 10 and then with the oxygen component 12 to form the combustor feed 14.

The water component 11 of the starting feed is heated to its boiling point and vaporised by way of a submerged boiler heat exchanger 26 that receives heat exchange fluid in the form of the reaction mixture 16 by way of a submerged heat exchanger 27, and/or in the form an externally-sourced heating medium 28 by way of a submerged heat exchanger 29. A valve 30 provides for blowdown 31 to waste in order to avoid build-up of dissolved solids in the heat exchanger 26.

One or the other or (as illustrated) both of the gaseous ammonia and oxygen components 10 and 12 of the starting feed is (or are) heated in a heat exchanger 32 to a temperature that precludes condensing of the vaporised water stream 25 upon mixing with that stream. As illustrated, the heat transfer fluid for the heat exchanger 32 desirably comprises the reaction mixture 18 following its passage through (and heat loss/temperature drop in) the submerged heat exchanger 27, although the heat transfer fluid may be heated by a source of heat that is external to the process illustrated by FIG. 2. In the former case the heat exchanger 32 may be considered as a feed-effluent heat exchanger.

The temperature of the reaction mixture 16 drops to a level of about 140° C. in passing through the heat exchanger 26 and drops further to about 120° C. (above the dew point) in passing through the heat exchanger 32.

Other aspects of the process illustrated by FIG. 2, including the ammonia oxidation and reaction gas absorption processes are substantially as previously described in the context of FIG. 1.

Reference is now made to the third example embodiment of the invention; that is to the process to which the flow diagram of FIG. 3 applies. Some of the process stages of, and, hence, processing equipment shown in, the flow diagram of FIG. 3 are the same as those of FIGS. 1 and 2 and, as in the case of the FIG. 2 embodiment, are not re-described. Again, like reference numerals are used to identify like equipment in the respective figures.

In the process illustrated by FIG. 3, ammonia 10, water 11 (or, although not shown, aqueous ammonia from a single source) and oxygen 12 (all at about ambient temperature) are fed under pressure as an aqueous ammonia-oxygen feed 34 to a feed-effluent heat exchanger 35. The feed 34 may be derived in various ways but, as shown in FIG. 3, the ammonia component 10 of the starting feed at a pressure slightly above atmospheric is dissolved in both the water component 11 of the starting feed and a liquid recycle stream 36 to form an aqueous ammonia stream 37. The aqueous ammonia stream 37 is cooled in a cooler 38 to about 60° C. and pressurised by a pump 39 to a pressure slightly above the combustor pressure, typically, as described previously, at about 2 bar (abs.).

The feed 34 (comprising the aqueous ammonia stream 37 and the oxygen component 12 of the starting feed) is fed to a first channel system 40 of a feed-effluent heat exchanger 35, and the feed 34 in passing through the heat exchanger is heated to a temperature level which permits vaporisation of ammonia and water within the aqueous ammonia stream into the oxygen stream. The resulting steam-ballasted ammonia-oxygen feed is delivered as a combustor feed 41 to the combustor 15 by way of a separator 42.

The separator 42 (which may be of a conventional type known in the art) is provided to remove excess aqueous ammonia that is added to the feed 34 and would otherwise remain in the combustor feed 14. The excess aqueous ammonia is added to the feed 34 to avoid drying-out of feed through the first channel system 40 of the feed-effluent heat exchanger 35 and the build-up of solids/corrosion in the channel system.

The removed liquid may be exhausted from the system simply as a blow-down stream 43 from the separator 42, by way of a cooler 44 and a pressure reducing valve 45, or (in the interest of minimising waste of aqueous ammonia feed) at least a major component of the removed liquid may, as shown, be returned to the water feed stream as the recycle stream 36 (as distinct from a starting feed component as such). The blow-down stream 43 is provided for the purpose of avoiding excessive build-up of dissolved solid impurities within the recycling loop and the blow-down stream will typically comprise a small fraction (1% to 10%) of the feed water stream.

As a general observation, all of the feed water other than the blowdown is evaporated to form the steam ballast. However, in order to keep the walls on the feed side of the feed-effluent heat exchanger 35 reliably wet, the outlet vapour fraction of the exchanger feed desirably is kept no higher than about 50% (w/w), with the residual liquid being recycled to complete the evaporation. The combination of fresh feed and recycle flows produces an excess of water on the feed side of the feed-effluent heat exchanger. The desired rate of generating steam in the exchanger may be controlled by using a control valve 46 located in circuit between the quench boiler 17 and the reaction mixture feed to the feed-effluent heat exchanger 35. The control valve may be used to modify the pressure difference between the feed and effluent sides of the exchanger, thereby modifying the amount of heat available from the effluent stream to heat and evaporate the liquid in the feed stream. Additionally, the control valve 46 may be used to adjust the pressure of the reaction mixture feed, for the purpose of regulating the amount of steam raised to provide the required degree of ballast.

The reaction mixture 16 is delivered by way of the quench boiler 17 (which drops the reaction mixture temperature to about 140° C.) and the control valve 46 to a second channel system 47 in the feed-effluent heat exchanger 35, and thence to the series-connected channel system 20 of the heat exchanger 19.

Figure 4:
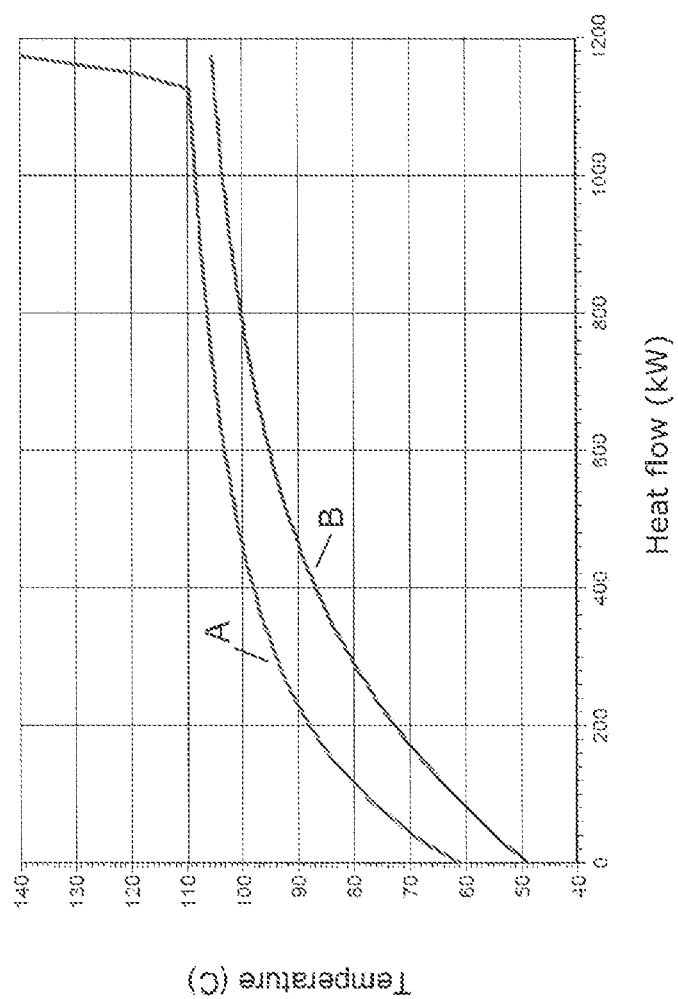
FIG. 4 shows graphs, of temperature against heat, that illustrate a typical operation of counter-flow feed-effluent heat exchange in the heat exchanger shown in FIG. 3.

The (relatively) high-temperature reaction mixture feed through the channel system 47 exchanges heat with the counter-flowing aqueous ammonia-oxygen feed through the channel system 40. The graphs of FIG. 4, in showing temperature against heat, illustrate a typical operation of the counter-flow feed-effluent heat exchange that occurs in the feed-effluent heat exchanger 35. Graph A is applicable to the reaction mixture in the channel system 47 as it cools, with condensation of water, and Graph B is applicable to the feed stream undergoing (partial) evaporation of the aqueous ammonia in the channel system 40 during each pass.

The reaction mixture feed (at a reduced temperature of about 60° C.) from the feed-effluent heat exchanger is fed directly into the channel system 20 of the heat exchanger 19 and exchanges heat with the coolant medium 22 counter-flowing through the second channel system 21 of the heat exchanger/absorber 19. The ammonia oxidation and reaction gas absorption processes that occur in the series-connected channel systems 47 and 20 of the feed-effluent heat exchanger 35 and the condensing-absorption heat exchanger 19 are substantially as previously described in the context of the process described with reference to FIG. 1.

The quantity (flow rate) of the oxygen component 12 of the starting feed desirably is controlled such that it is sufficient to effect oxidation of all (or substantially all) of the ammonia and nitrous gas in the process. However, in a modification of the process the quantity of oxygen in the starting mixture may be controlled to oxidise at least substantially all of the ammonia and further oxygen may be added to the reaction mixture before water begins to condense from the reaction mixture in order to oxidise substantially all of the nitrous gas. Thus, the further oxygen may be admitted at any one or two or all of the three injection points 16a, 18a and 18c indicated by dashed lines in FIG. 3.

Similarly, the quantity of water in the feed 34 to the feed-effluent heat exchanger 35 is controlled such that, when condensed out from the reaction mixture in the heat exchanger 19 and reacted with (i.e., during absorption of) the derived nitrogen dioxide, the condensate is present in an amount sufficient to form dilute (of the order of 20% (w/w) to 40% (w/w)) nitric acid. However, if required, further water may be admitted to the reaction mixture and cooled reaction mixture streams at one or both of the two injection points 16b and 18b indicated by the dashed lines in FIG. 3.

It will be understood that the example process that has been described with reference to FIG. 3 effectively embodies a feed-effluent heat exchange system, incorporating the feed-effluent heat exchanger, that is integrated with an absorber heat exchange system, incorporating the condensing-absorbing heat exchanger. In the feed-effluent heat exchange system the two-phase feed of aqueous ammonia and oxygen is heated to a temperature which allows the feed stream to the combustor to carry the required amount of ballast steam. On the other side of the exchange, reaction gas which is above the dew point enters the exchanger, is cooled to the dew point and further cooling is accompanied by condensation. Some nitrogen dioxide will be present in the incoming gas as a result of nitrogen monoxide oxidation in feed lines and the quench boiler prior to the feed-effluent heat exchange and, as the temperature and water content of the gas drop within the feed-effluent exchanger, the gas phase nitrogen monoxide oxidation accelerates and a rapidly increasing rate of acid formation will occur within the feed-effluent exchanger as the gases cool. Thus, it is not only water that condenses. In the absorber heat exchange system the process of nitrogen monoxide/nitrogen dioxide oxidation to nitric acid is completed. Coolant fluid lowers the temperature in the absorber-exchanger to a level below that in the feed-effluent exchanger and the residence time of the nitrous gases in the absorber is, by design of the system, sufficient for the oxidation process to run to substantial completion.

Variations and modifications may be made in the invention as above described and illustrated in the accompanying drawings without departing from the scope of the invention as defined in the following claims.

The invention claimed is:

1. A method for producing nitric acid comprising:
   providing a non-explosive gaseous oxidiser feed to a reactor, the non-explosive gaseous oxidiser feed comprising ammonia, steam and an oxidising gas;
   in the reactor, oxidising the ammonia of the non-explosive gaseous oxidiser feed to produce a reaction mixture comprising nitrogen monoxide and water vapor;
   providing the reaction mixture to a heat exchanger; and
   in the heat exchanger, cooling the reaction mixture and (i) oxidising the nitrogen monoxide to produce one or more oxidation products, (ii) condensing the water vapor to liquid water, and (iii) reacting the one or more oxidation products with the liquid water and (iv) absorbing the one or more oxidation products into the liquid water to form nitric acid at a concentration that is from 20% to 40% on a weight basis (w/w),
   wherein the non-explosive gaseous oxidiser feed has an excess of oxidising gas in an amount that is sufficient to convert greater than 95% of the nitrogen monoxide in the reaction mixture to nitric acid.

2. The method of claim 1, wherein the oxidising gas comprises a gas containing at least 90% (v/v) oxygen.

3. The method of claim 1, wherein, if conversion of the nitrogen monoxide to nitric acid is not 100% in the heat exchanger, the method is continued in a subsequent reaction-absorber vessel or pipe.

4. The method of claim 3, wherein the method is continued with or without heat exchange; or is continued in an adiabatic reaction-absorber.

5. The method of claim 1, wherein the oxidising gas in the non-explosive gaseous oxidiser feed is provided in an amount sufficient to oxidise substantially all of the ammonia in the non-explosive gaseous oxidiser feed.

6. The method of claim 1, wherein the non-explosive gaseous oxidiser feed is provided from a starting feed and the starting feed comprises ammonia in a gaseous state.

7. The method of claim 1, wherein the non-explosive gaseous oxidiser feed is provided from a starting feed, wherein the starting feed comprises a water component in a liquid state and wherein the water component is vaporised to form the steam of the non-explosive gaseous oxidiser feed.

8. The method of claim 7, wherein the water component of the starting feed is vaporized prior to mixing with the ammonia and the oxidising gas of the non-explosive gaseous oxidiser feed or following mixing with the ammonia and the oxidising gas of the non-explosive gaseous oxidiser feed.

9. The method of claim 1, wherein the non-explosive gaseous oxidiser feed is provided from a starting feed, wherein the starting feed is provided with the ammonia in a gaseous state and with a water component in a liquid state, and wherein the water component of the starting feed is vaporised prior to mixing, firstly, with the ammonia component of the starting feed and then with an oxidising gas component of the starting feed to form the non-explosive oxidiser feed.

10. The method of claim 9, wherein the water component of the starting feed is vaporised by heat exchange with the reaction mixture, wherein the oxidising gas component of the starting feed is heated by heat exchange with the reaction mixture, and wherein the ammonia of the starting feed is heated by heat exchange with a heat transfer fluid prior to mixing with the vaporised water component of the starting feed.

11. The method of claim 1, wherein the non-explosive gaseous oxidiser feed is provided from a starting feed comprising an oxidising gas component, an ammonia component and a water component in a liquid state, wherein the ammonia component is dissolved in the water component to form aqueous ammonia, wherein the aqueous ammonia component is mixed with the oxidising gas component, and wherein the aqueous ammonia component and the oxidising gas component are together heated by heat exchange to a temperature at which ammonia and water in the aqueous ammonia vaporises into the oxidising gas component to form the non-explosive gaseous oxidiser feed.

12. The method of claim 11, wherein the aqueous ammonia component and the oxidising gas component are heated as a feed stream by heat exchange with the reaction mixture.

13. The method of claim 12, wherein, following ammonia oxidation, the reaction mixture is cooled to a first temperature above the dew point of the reaction mixture by heat exchange with a heat transfer fluid, and wherein the reaction mixture is further cooled to a second temperature below the dew point of the reaction mixture by feed-effluent heat exchange with the feed stream.

14. The method of claim 13, wherein the feed-effluent exchange is effected in a feed-effluent heat exchanger that is integrated with the heat exchanger in which the one or more oxidation products react with and are absorbed by the liquid water.

15. The method of claim 13, wherein any liquid component remaining in the feed stream following the feed-effluent heat exchange is separated from the feed stream and recycled into the aqueous ammonia component of the starting feed.

16. The method of claim 1, wherein the heat exchanger has fluid flow passages that have cross-sectional dimensions less than 3 mm equivalent diameter.

17. The method of claim 1, wherein the heat exchanger has fluid flow passages that have cross-sectional dimensions less than 2 mm equivalent diameter.

18. The method of claim 1, wherein supplementary water, in a liquid or vapor state, is injected into the reaction mixture to facilitate the provision of sufficient condensate to enable substantially complete oxidation and absorption of the one or more oxidation products in the liquid water.

19. The method of claim 1, wherein, in the heat exchanger, nitric acid is generated at a temperature of less than or equal to about 200° C.

20. The method of claim 1, wherein the reaction mixture is cooled and reacted to generate nitric acid in an additional heat exchanger downstream of the heat exchanger.

21. The method of claim 20, wherein the heat exchanger generates nitric acid at a first temperature and the additional heat exchanger generates nitric acid at a second temperature, wherein the second temperature is less than the first temperature.

22. The method of claim 1, wherein the non-explosive gaseous oxidiser feed is heated in the reactor with heat brought about from heat release from ammonia oxidation, heat exchange with an external fluid, or by a combination of heat release from ammonia oxidation and heat exchange with an external fluid.

23. The method of claim 1, wherein providing the non-explosive gaseous oxidiser feed comprises (i) mixing a gaseous ammonia feed with a steam feed to form a starting feed and (ii) mixing the starting feed with an oxidising gas feed to generate the non-explosive gaseous oxidiser feed.

24. The method of claim 1, wherein the non-explosive gaseous oxidiser feed has an excess of oxidising gas in an amount that is sufficient to convert all of the nitrogen monoxide in the reaction mixture to nitric acid.

* * * * *